Sept. 26, 1950     J. L. CREVELING     2,523,752
ELECTRIC REGULATION OPERATED SWITCH
Filed Nov. 29, 1944
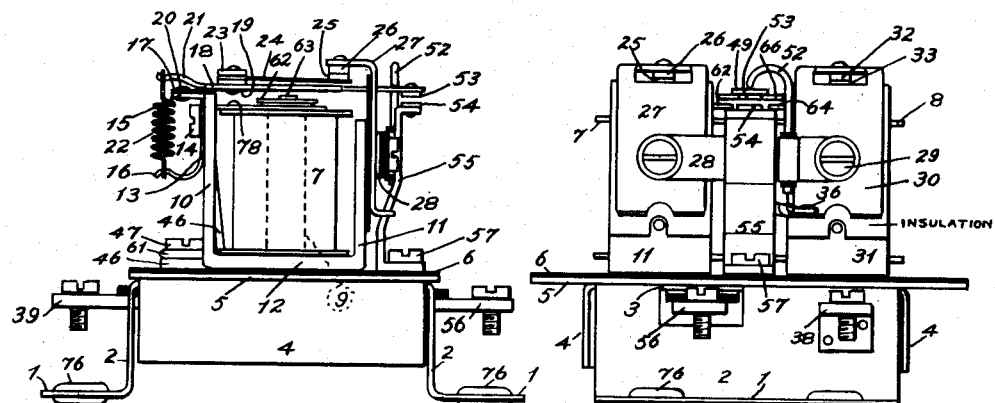
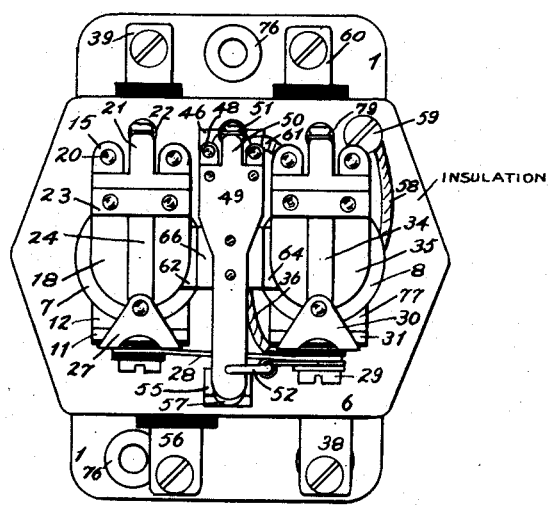
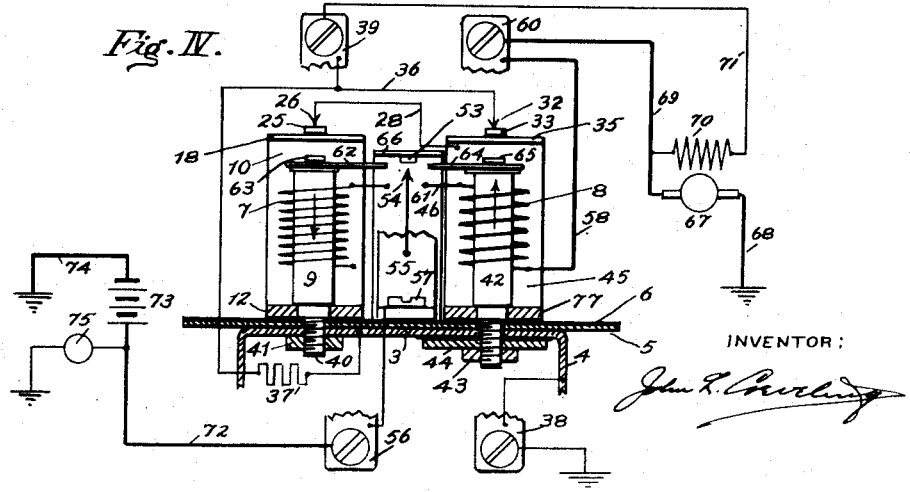
INVENTOR:
John L. Creveling Patented Sept. 26, 1950

2,523,752

UNITED STATES PATENT OFFICE 2,523,752

ELECTRIC REGULATION OPERATED SWITCH

John L. Creveling, near Tucson, Ariz.; Anna W. Creveling executrix of said John L. Creveling, deceased Application November 29, 1944, Serial No. 565,739

18 Claims. (Cl. 200—98)

My invention pertains to that class of electric regulation wherein a dynamo or generator is to be regulated automatically in a predetermined manner throughout a wide variety of changeable conditions, and also comprehends means whereby it will be automatically connected with and disconnected from its work under certain predetermined conditions.

As my invention is particularly applicable to an electric system wherein a dynamo driven intermittently and at widely varying speeds is employed to charge a storage battery and operate lamps or other translating devices which are supplied by the battery when the generator speed and consequent voltage are below the values necessary to supply current to its load, it will be described with respect to such a system.

Obviously, such systems are especially useful for supplying current to the many electrical devices now carried by moving vehicles and wherein a dynamo or generator is driven by connection with an element deriving its motion from that of the vehicle or from the power plant propelling the vehicle.

As vehicles covered generally by the term "automobile" have at the present time the widest demand for this type of system, my invention will be described with particular reference to such an application thereof.

An object of my present invention is to provide a combined regulator and automatic switch wherein the same parts may affect both instrumentalities and thereby make for simplicity and cheapness of manufacture.

Another object is to provide a regulator which will automatically control the voltage of the generator in a predetermined manner under widely varying conditions of speed and load.

Another object is to provide a regulator which will automatically control the current of the generator in a predetermined manner under certain widely varying conditions of operation.

Another object of my invention is to provide a regulator which will be capable of automatically providing substantially independent current and voltage regulation.

In the drawing, like numerals indicate like parts, and

Fig. I is a side elevation of one type of device included in my invention.

Fig. II is a front elevation of the device illustrated in Fig. I as viewed from the right.

Fig. III is a top plan of the device of Figs. I and II as seen when looking downwardly upon Fig. II.

Fig. IV is a diagrammatic representation of a system including the structure of Figs. I, II and III, disclosing the electric and magnetic circuits of the apparatus of said figures.

In the drawing the sheet iron structure comprising the feet 1, legs 2, body portion or plate 3 and skirts 4 has attached thereto the iron plate 5 upon which rests the insulating sheet 6, underlying the operating instrumentalities. These include a voltage coil 7 operating voltage regulating means, a current coil 8 operating current regulating means, and a switch or reverse current relay operated by the joint effect of the said coils. Save for the winding of the coils the voltage and current regulating structures are substantially alike and may be described with reference to the voltage regulator shown in elevation in Fig. I and the current regulator appearing in the other figures. In Fig. I the coil 7 is shown as provided with a core 9, appearing in dotted lines, which is carried by the magnet frame comprising the vertical limbs 10 and 11 and yoke 12. The limb 10 has attached thereto the member 13 as by screw 14. Member 13 is provided with a pair of horizontal ears 15 (see Fig. III) and a bendable hook portion 16. The ears 15 carry a thin piece of sheet iron 17 resting upon the top of limb 10, which is slightly overlapped by a portion of the armature 18 held in place by a thin metal strip 19 which is attached to the ears 15 of member 13 by rivets 20 passing through 15, member 17 and strip 19. The armature 18 is provided with a contracted portion 21 which is arched so as to permit a limited free movement of the armature and which is engaged by spring 22, which, by engagement with the hook 16, tends to rotate the armature in a counter-clockwise direction. The armature carries a pair of metal strips 23, between which is clamped the leaf spring 24 provided at its free end with a contact member 25 which, by contact with the member 26, limits the rotation of the armature by the spring 22.

Member 26 is carried by sheet metal member 27 supported by the limb 11 and insulated therefrom as indicated, and electrically connected with the metal strip 28, which in turn is electrically connected with the screw 29, (Figs. II and III) insulated from the member 30 which is similar to the member 27. Screw 29 is threaded into the limb 31 of the current coil frame and thus members 27 and 31 are electrically united. Member 30 is provided with a contact member 32 engaged by member 33 which is carried by leaf spring 34 attached to the armature 35, in the same manner as spring 24 of the voltage regulator in Fig. I, and spring 79 tends to close the contact at 32—33 in the same manner as spring 22 operates in Fig. I. Member 30 is electrically connected by wire 36, with one side of a resistor 37, shown only in diagram in Fig. IV, which has its opposite side connected to ground by connection with part 3, which is connected with the ground lug 38, as indicated in Fig. IV. In practice this resistor is carried in approximately the position shown in Fig. IV, and has one end supported by an extension of lug 39 under the magnets so as to be protected by the legs 2 and skirts 4. The core 9 and magnet frame of the voltage coil are grounded by means of the extension 40 of core 9 and the nut 41 bearing against the plate 3, while the core 42 and frame 31 of the current coil are insulated from the metal base members as indicated in Fig. IV, as the extension of core 42 passes through a bushing in the base and nut 43 bears against the iron plate 44 which is insulated from the base as indicated. Between the vertical limb 19 of the voltage magnet and the like limb 45 of the current magnet there is placed the insulated member 46 of non-magnetic metal, secured to the base as by screw 47, which has its upper end bent to lie horizontally and shaped with ears 48 similar to ears 15 of Fig. I, and also provided with a spring engaging a hook similar to 16 of Fig. I.

The ears 48 are riveted to a spring strip which is riveted to the switch number 49 (Fig. III) so that 49 is mounted in a manner similar to armatures 18 and 35 of the voltage and current magnets.

Member 49 is made of non-magnetic metal and has an extension 50, similar to 21 of Fig. I, which is engaged by the spring 51 which tends to hold the opposite end of member 49 in contact with the insulated bendable stop 52.

The free end of member 49 is provided with a contact member 53 adapted, when moved downwardly, to bear upon contact member 54 carried by the insulated riser 55 of non-magnetic metal electrically connected with the insulated lug 56 as by screw 57.

One end of the current coil 8 is connected by wire 58 and screw 59 with the insulated lug 60 while the opposite end is connected with member 46 as by the wire 61.

The upper end of core 9 is provided with a pole piece 62 held thereon by a non-magnetic screw 63 which serves as a stop, limiting any excessive downward movement of the armature 18, while the core 42 is provided with a similar pole piece 64 and screw 65.

The switch member 49 carries an operating armature 66 adapted to be drawn downwardly toward the pole pieces 62 and 64 when energized, in a manner that will be later explained.

In service the regulator is held in proper position by screws passing through the rubber grommets 76 and therefore the base members are insulated from grounding even though the apparatus be mounted upon a metal dash board as is now common practice. On this account the ground lug 38 is provided and this is connected to ground as indicated in Fig. IV.

In Fig. IV the usual generator is shown at 67 with one brush connected to ground by wire 68 and the other brush connected with the lug 60 by wire 69.

The field coil 70 has one terminal connected with one brush of the generator and the other connected by wire 71 with the lug 39.

The storage battery 73 and lamps or other translating devices 75 have one terminal connected with the lug 56 by wire 72 while their other terminals are connected to ground. An operation of the system as indicated in Fig. IV, taken together with the other figures, is substantially as follows:

If the generator be still, the contact at 53—54 will be open and the lamps or translating devices 75 may be supplied by the battery 73 in an obvious manner.

If the generator be started and the left brush be considered positive, current will flow through field coil 70 and wire 71 to lug 39 and thence through wire 36, contact 32—33, armature 35, member 45, connector 28, contact 26—25, armature 18, member 10, member 12, extension 40 of core 9 and nut 41 to the plate 3 and leg 2 and thence to lug 38 and to ground, and return to the generator through wire 68.

At this time some current will also flow through wire 36 and resistor 37 to the base 3 and thence to ground. This, however, will be of small value as the resistor 37 is short circuited by the circuit through contacts 33—32 and 26—25 causing the generator field to build up rapidly upon starting. Current will also flow through wire 69 to lug 60, thence through coil 8 and wire 61 to member 46 thence through voltage coil 7 to member 10, and thence to ground and to the generator as outlined above.

At this time the current through current coil 8 will be small owing to the resistance of coil 7, but the current in coil 8 will tend to cause a flux through core 42 in the direction of the arrow and then across the gap to armature 35, from which return is made through member 45 and yoke 77 to core 42.

The current in coil 7 will tend to cause a flux through core 9 in the direction of the arrow, and through yoke 12, member 10, armature 18 and thence across the gap to core 9.

Energizing coils 7 and 8 will also cause a flux in the magnetic circuit including core 42, pole piece 64 and gap, armature 66 and gap, pole piece 62, core 9, member 12, members 5, 3, 40 and 41, plate 44, nut 43, extension of core 42 and member 77, to core 42.

The flux across the gap between core 42 and armature 35 will of course tend to attract the armature 35 to break the contact at 33—32, while the flux across the gap between armature 18 and core 9 will tend to break the contact at 26—25, and the flux across the gaps between pole pieces 62 and 64 and armature 66 will tend to draw the armature and member 49 downwardly to close the contact at 53—54.

If the generator speed now increases until its voltage is substantially equal to that of the battery, I so adjust the spring 51, engaging the extension 50 of member 49, that the flux across the gaps between the pole pieces 62 and 64 and armature 66 will draw the armature downwardly and close the contact 53—54, whereupon the generator will be connected through coil 8, wire 61, member 46, member 49, contact 53—54, member 55, screw 57, lug 56 and wire 72 with the lamps or translating devices 75 and battery 73, from which return is made through the ground connections as shown.

Now the generator may supply current to its load circuit and, if the generator speed increases, the current supplied will tend to rise as will the voltage impressed upon the coil 7.

If the voltage of the battery be low, as when discharged, or if the translating circuit load be heavy, the current in coil 8 may reach the maximum desired current to have supplied by the generator before the maximum voltage desired to have impressed across the battery is reached; and, assuming this to be the instant case, I now so adjust the spring 79 affecting the current armature 35 that, when this maximum value is reached, the flux across the gap between core 42 and armature 35 will draw the armature downwardy and break the contact at 32—33 and thus cause all of the field current to pass through the resistor 37, which action will cause vibration of the contact to hold the maximum current value from being exceeded throughout further rise in generator speed, in a manner now so well known as to need no further description.

If, while thus operating, the battery becomes sufficiently charged that its voltage rises until it requires the maximum voltage desired to have impressed across the battery to deliver this current, I so adjust the spring 22 that this voltage will cause coil 7 to draw its armature downwardly and break the contact at 25—26, and the voltage coil will then usurp the regulation by vibrating this contact to hold this voltage from being exceeded in a now well-known manner throughout further increase in generator speed.

Thus if the battery voltage rise further as approaching a fully charged state, the charging current will fall off and approach a small value or even practically zero.

If the generator now slow down, the reverse operation will take place and, if the generator voltage fall slightly below that of the battery, the current through coil 8 will reverse and oppose that of coil 7 and cause the contact at 53—54 to open and disconnect the generator from the battery and prevent back discharge through the generator.

While the magnet frame and core of the voltage regulator are electrically connected with the members 3 and 5, and the large area of the yoke 12 and the metallic connection of the extension of core 40 cause a magnetic connection with the said iron members, the current regulator core and yoke are insulated from said members 3 and 5, but the large area of iron in the yoke 77 and the large area of the plate 44, each of which is separated from the iron plates 3 and 5 by a thin sheet of insulation, cause the said plates to act as a yoke for cores 9 and 42 with relatively low magnetic reluctance.

In Fig. I the voltage coil is shown as having a member 78 acting as a magnetic shunt to the armature and which is made of a material the reluctance of which increases upon rise in temperature for the purpose of compensating for the temperature rise in the voltage coil due to heat loss therein, in a now well-known manner.

Other types of devices for temperature compensation and even more appropriate kinds may be used without departing from my invention, as the particular type of such means forms no part of the present invention and many are now known in the art.

This particular means of temperature compensation is here shown to avoid altering the structure of the voltage and current regulating elements in any way, other than just applying the switch and its operating means to the voltage and current regulators of one of the most common forms of commercial regulating sets now in use by the million on automobiles.

These sets, as now in common use, employ a third unit or reverse current relay comprising a voltage coil, current coil, core and connections, which are not required in the present structure and, therefore, a considerable saving is effected and a more compact device produced with a large saving in base and cover material also, as will be noted from the Figs. I, II, and III which are substantially full-size drawings of my regulator and switch using only two coils of such an automobile regulator set and only two-thirds the size of the usual sets. Further, the current consumption of the switch or reverse current relay is also avoided as well as the heat due to the switch coils.

It will be plain that the flux through the pole pieces 62 and 64 and armature 66 of the switch may be adjusted by properly proportioning the pole pieces and armature with respect to saturation, and that it is advantageous to have ample cross sections of cores 9 and 42.

And, it is to be noted that the particular structure here shown merely to disclose my invention is taken as including the regulators having the dimensions of a structure now in general use, for the purpose of pointing out the saving that may be effected by the employment of my invention in a structure which operates satisfactorily, though in manufacturing I prefer to increase the core sections slightly.

In practice I provide the lower side of armature 66 with a thin coat of insulating material so as to protect against electrical connection of the pole pieces by the armature in case it might touch the pole pieces in the process of adjustment or due to rough handling.

It will, of course, be obvious that, in systems where large currents are employed, a small device as here indicated may be used by having the switch portion act as a relay for any suitable type of contactor and by having the vibrating contacts control any suitable kind of electrically controlled resistance device in the field of the generator, and that the structure here shown may control the field of an exciter which in turn may control the main dynamo—which arrangements are now all commonly used and well known in the art.

I do not here limit myself to any of the exact constructions shown nor to any of the particular modes of operation herein described, which have been set forth merely to illustrate an embodiment of my invention, which is as set forth in the following claims.

I claim:

1. A combined generator regulator and automatic switch including a voltage responsive coil having a nearly closed magnetic circuit of magnetic material, regulating means operated by a flux through said circuit, a current coil having another nearly closed magnetic circuit of magnetic material, regulating means operated by a flux through said circuit, said magnetic circuits being disposed side by side in substantially parallel planes, and switch mechanism operated by a flux affected by said coils and substantially normal to said planes.

2. A combined generator regulator and automatic switch including a voltage responsive coil having a nearly closed magnetic circuit of magnetic material, regulating means operated by a flux through said circuit, a current responsive coil having another nearly closed magnetic circuit of magnetic material, regulating means operated by a flux through said circuit, said magnetic circuits being disposed side by side in substantially parallel planes, and switch mechanism operated by a flux due to said coils and substantially normal to said planes, 3. A combined generator regulator and automatic switch including a voltage responsive coil having a nearly closed magnetic circuit of magnetic material, regulating means operated by a flux through said circuit, a current responsive coil having another nearly closed magnetic circuit of magnetic material, regulating means operated by a flux through said circuit, and an automatic switch having a magnetic circuit traversed by a flux due to said coils in a direction in a plane substantially normal to that in either of said first two magnetic circuits.

4. An electric regulator and switch assembly including a base member of magnetic material, a voltage responsive regulator and a current responsive regulator individually mounted upon said base, each of which regulators has a nearly closed magnetic circuit of magnetic material exclusive of said base, one of said magnetic circuits being electrically connected with said base and the other insulated therefrom, and switch mechanism including an operating element operatively affected by the joint magnetic effect of said regulators through the medium of said base.

5. A combined regulator and switch, including a voltage responsive regulating means, and current responsive regulating means, each of said regulating means having an energizing coil, a separate core for said coil and an independent horse shoe magnet frame cooperating therewith, the combination including a base upon which said frames are mounted side by side in spaced parallel planes, and a switch including operating means operated by flux passing through said cores upon changes in said flux.

6. A combined regulator and switch, including a base, a voltage responsive regulating means, and current responsive regulating means, each of said regulating means having an energizing coil, a separate core therefor and a cooperating magnet frame comprising a yoke and two substantially parallel members joined thereby, said yokes being substantially parallel to each other and resting upon said base and a switch including operating means operated by flux passing through said cores upon changes in said flux.

7. A combined electric regulator and automatic switch comprehending, a base, voltage responsive regulating means and current responsive regulating means, each said means being individually mounted upon said base and including a coil, a separate core therefor, an armature, and individual ferro-magnetic circuit completing means associated with said core and armature, a regulating device operated by said armature, and a pole piece extending toward the other regulating means, said combined structure having a member magnetically connecting said cores, and a switch disposed between said regulating means having an armature operated by flux through said cores, pole pieces, said member and switch armature.

8. A combined electric regulator and automatic switch comprehending, voltage responsive regulating means and current responsive regulating means, each said means including a coil, a separate core for said coil, an armature in operative relation to said core and coil, and individual ferro-magnetic circuit completing means associated with said core and armature, a regulating device comprising a vibratory contact operated by said armature, and a pole piece for said core extending toward the other regulating means, said combined structure including a magnetic member carrying flux between said cores, and a switch disposed between said regulating means having an armature operated by flux through said cores, pole pieces, said member and armature.

9. A combined electric regulator and automatic switch comprehending, voltage responsive regulating means and current responsive regulating means, each said means including a coil, a separate core for said coil, an armature in operative relation to said core and coil, and individual ferro-magnetic circuit completing means associated with said core and armature, a regulating device comprising a vibratory contact operated by said armature, and a pole piece for said core extending toward the other regulating means, said combined structure including a magnetic member carrying flux between said cores and a switch disposed between said regulating means having an armature operated by flux through said cores, pole pieces, said member and switch armature, said ferro-magnetic circuits being electrically insulated from each other and magnetically cooperative through a relatively low reluctance gap.

10. A combined electric regulator and automatic switch comprehending, voltage responsive regulating means and current responsive regulating means, each said means including a coil, a separate core for said coil, an armature in operative relation to said core and coil, and individual ferro-magnetic circuit completing means associated with said core and armature, a regulating device comprising a vibratory contact operated by said armature, and a pole piece for said core extending toward the other regulating means, said combined structure including a magnetic member carrying flux between said cores and a switch disposed between said regulating means having an armature operated by flux through said cores, pole pieces, said member and switch armature, said ferro-magnetic circuits being electrically insulated from each other and magnetically cooperative by means of a large area short non-magnetic gap.

11. A combined generator regulator and reverse current relay adapted to limit the voltage and current of a generator and to connect a generator with and disconnect it from a load circuit, said combination including two magnetically and separately operable regulating means each comprising a vibratory contact adapted to affect a generator, an armature movement of which affects said contact, and a nearly closed individual magnetic circuit of magnetic material including said armature and a magnet core, said magnetic circuits lying side by side in substantially parallel planes, one of said magnet cores being provided with a voltage responsive winding and the other with a current responsive winding, said cores each having a pole piece extending therefrom the structure of said combination including a magnetic member carrying flux between said cores, an armature operated by flux through said cores, pole pieces, said member and last mentioned armature and switch mechanism operated by said last mentioned armature.

12. A combined generator regulator and reverse current relay adapted to limit the voltage and current of a generator and to connect a generator with and disconnect it from a load circuit which may contain a storage battery, said combination including two magnetically and separately operable regulating means each comprising a vibratory contact adapted to affect a generator, an armature movement of which affects said contact, and a nearly closed individual magnetic circuit of magnetic material including said armature and a magnet core, said magnetic circuits lying side by side in substantially parallel planes, one of said magnet cores being provided with a voltage responsive winding and the other with a current responsive winding, said magnetic circuits being mounted upon a base of magnetic material from which one at least is electrically insulated, and said cores each having a pole piece extending therefrom, said combined structure including an armature operated by flux through said cores, pole pieces, last mentioned armature and said base, and switch mechanism operated by said last mentioned armature.

13. A combined generator regulator and switch including a complete voltage responsive individually operable regulator unit of the vibrating contact type, a complete current responsive individually operable regulator unit of the vibrating contact type, a separable base individually supporting and magnetically connecting said units whereby they may cooperate to set up a joint magnetic flux and a switch having operating means operated by said flux and responsive to changes therein.

14. A combined automatic generator regulator and switch including a complete voltage responsive regulator unit and a complete current responsive regulator unit, each said unit comprising an individual nearly complete ferro-magnetic circuit including a core having an energizing coil and vibratory armature and vibratory contact operated thereby, combined with a base supporting and magnetically connecting the magnetic circuits of said regulators to carry flux from one to the other, an armature operated by said flux and switch mechanism operated by said armature.

15. A combined automatic generator regulator and switch including a complete voltage responsive regulator unit and a complete current responsive regulator unit, each said unit comprising an individual ferro-magnetic circuit portion including a core having an energizing coil and vibratory armature in operative relation to said core and vibratory contact operated thereby, combined with means supporting and magnetically connecting the magnetic circuits of said regulators to carry flux from one to the other, said coils being so wound as to jointly effect said flux, an armature operated by said flux and switch mechanism operated by said armature.

16. A combined electric regulating means and switch including a voltage responsive regulator having regulating means, a nearly closed ferromagnetic circuit and energizing means therefor, a current responsive regulator having regulating means, a nearly closed ferro-magnetic circuit and energizing means therefor, said magnetic circuits being electrically insulated from each other and having functional electrical connection through the regulating means, and a switch operated by the energizing means of said regulators.

17. A combined generator regulator and automatic switch including a voltage responsive coil having a nearly closed magnetic circuit of magnetic material and regulating means operated by a flux through said circuit, a current responsive coil having another nearly closed magnetic circuit of magnetic material and regulating means operated by a flux through said circuit, said magnetic circuits being electrically insulated from each other and having electrical connection through the regulating means, and switch mechanism operated by a magnetic flux functionally affected by both said coils.

18. A combined electric regulator and automatic switch, including a voltage responsive regulating means and a current responsive regulating means, each said regulating means being separately operable to perform a regulating function and each including a regulating element, an energizing coil, a separate core, an armature and a magnet frame having a member substantially parallel to said core and a yoke magnetically connecting said member with said core, said yokes being substantially parallel to each other in different planes, and switch mechanism having operating means affected by flux substantially normal to said planes through said cores and operating in response to changes in said flux.

JOHN L. CREVELING.

REFERENCES CITED

The following references are of record in the file of this patent:

UNITED STATES PATENTS

| Number | Name | Date |
| --- | --- | --- |
| 989,792 | Miller | Apr. 18, 1911 |
| 1,427,369 | Fortescue | Aug. 29, 1922 |
| 1,497,500 | Geisslinger | Jan. 1, 1924 |
| 1,576,768 | Loudon | Mar. 16, 1926 |
| 2,161,929 | Milliken | June 13, 1939 |
| 2,209,051 | Clayton | July 23, 1940 |
| 2,307,025 | Creveling | Jan. 5, 1943 |
| 2,339,037 | Thompson | Jan. 11, 1944 |
| 2,339,526 | Thompson | Jan. 18, 1944 |
| 2,354,038 | Menzel | July 18, 1944 |
| 2,358,482 | Thompson | Sept. 19, 1944 |

FOREIGN PATENTS

| Number | Country | Date |
| --- | --- | --- |
| 6,425 | Great Britain | 1914 |